United States Patent
Chen et al.

(10) Patent No.: US 8,293,877 B2
(45) Date of Patent: Oct. 23, 2012

(54) REACTIVE DYESTUFF WITH N-ALKYLAMINO GROUP

(75) Inventors: Wen-Jang Chen, Taoyuan Hsien (TW); Chen-Lung Kao, Taoyuan Hsien (TW); Chien-Yu Chen, Taoyuan Hsien (TW); Huei-Chin Huang, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 240 days.

(21) Appl. No.: 12/659,918

(22) Filed: Mar. 25, 2010

(65) Prior Publication Data

US 2011/0015378 A1    Jan. 20, 2011

(30) Foreign Application Priority Data

Jul. 15, 2009    (TW) ................................ 98123860 A

(51) Int. Cl.
*C09B 62/507* (2006.01)
(52) U.S. Cl. ........................ 534/634; 534/637
(58) Field of Classification Search .......................... None
See application file for complete search history.

(56) References Cited

U.S. PATENT DOCUMENTS

| | | | | |
|---|---|---|---|---|
| 4,638,054 | A | * | 1/1987 | Herd et al. ................. 534/634 |
| 5,552,532 | A | | 9/1996 | Klier et al. |
| 5,717,078 | A | | 2/1998 | Tzikas et al. |
| 5,831,038 | A | | 11/1998 | Reichert |
| 5,837,827 | A | | 11/1998 | Reichert et al. |
| 5,931,975 | A | | 8/1999 | Muller et al. |

FOREIGN PATENT DOCUMENTS

EP    1760117 A2    11/2006

* cited by examiner

*Primary Examiner* — Fiona T Powers
(74) *Attorney, Agent, or Firm* — Bacon & Thomas, PLLC

(57) ABSTRACT

The present invention relates to a novel reactive dyestuff with a N-alkylamino group, represented by the following formula (I):

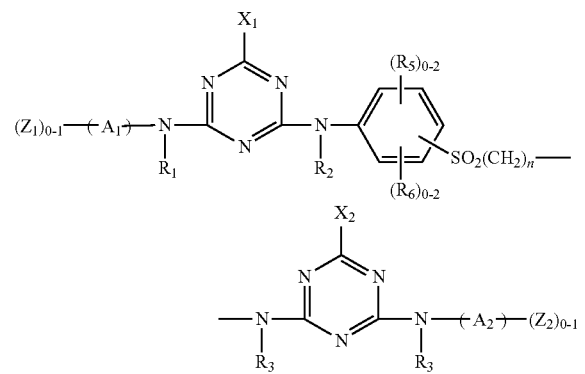

wherein $A_1$, $A_2$, $R_1$, $R_2$, $R_3$, $R_4$, $(R_5)_{0-2}$, $(R_6)_{0-2}$, $(Z_1)_{0-1}$, $(Z_2)_{0-1}$, $X_1$, $X_2$ and n are defined the same as the specification. The reactive dyestuff of the present invention is suitable for exhaust dyeing, cold batch-up dyeing, continuous dyeing, printing and digital spray printing materials that contain hydroxyl group or amino group fibers.

15 Claims, No Drawings

REACTIVE DYESTUFF WITH N-ALKYLAMINO GROUP

BACKGROUND OF THE INVENTION

1. Field of the Invention

The present invention relates to a novel reactive dyestuff with a N-alkylamino bridge group and, more particularly, to a novel reactive dyestuff suitable for exhaust dyeing, cold batch-up dyeing, continuous dyeing, printing and digital spray printing materials that contain hydroxyl group or polyamine fibers.

2. Description of Related Art

An azo dyestuff, where the chromophore thereof is composed of azo components and coupling components, can be widely employed and used as a reactive dyestuff for heavy color dyeing, such as red, navy, blue, black and so on, owing to its broad color gamut and high extinction coefficient.

Currently, the development of reactive dye is moving towards warm dyeing, higher fixation and better build up to meet the economic demands. Since sulphato-ethyl-sulphone (SES) reactive groups cannot meet customers' demands for cotton dyeing due to their poor resistance to alkaline, monochloro triazine (MCT) type dyestuffs are usually used for dyeing. However, the use of monochloro triazine (MCT) type dyestuffs in dyeing consumes more energy and the dyed materials exhibit poor water fastness.

For example, in U.S. Pat. Nos. 5,552,532, 5,931,975, 5,717,078, 5,837,827 and 5,831,038, such dyestuffs are developed.

However, the build up, hue-shift, levelness and wash fastness of the aforementioned novel dyestuffs cannot meet the market requirements. Thereby, it is desirable to improve the aforementioned properties.

SUMMARY OF THE INVENTION

The present invention provides a novel reactive dyestuff with a N-alkylamino bridge group, which exhibits the properties of improved fixation yield, excellent build up, high wash fastness and excellent wet fastness while dyeing cellulose fibers.

In the present invention, the novel reactive dyestuff with a N-alkylamino bridge group is represented by the following formula (I),

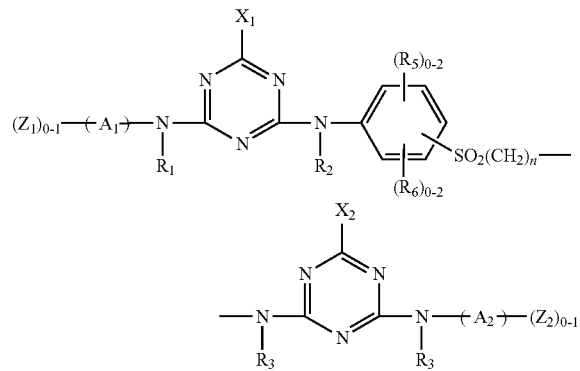

wherein, $A_1$ and $A_2$ each independently are selected from the group consisting of benzene, monoazo, disazo, polyazo and metal complex azo components;

$X_1$ and $X_2$ each independently are halogen, hydroxyl, quaternary ammonium or $-NR_1R_2$;

$R_1$, $R_2$, $R_3$ and $R_4$ each independently are hydrogen, $C_{1-4}$ alkyl, $C_{1-4}$ alkylcarbonyl, phenyl, nitroso, or $C_{1-4}$ alkyl substituted by halogen, hydroxyl, carboxyl or sulfo;

$(R_5)_{0-2}$ and $(R_6)_{0-2}$ each independently are 0 to 2 identical or different groups, and each of $R_5$ and $R_6$ independently is selected from the group consisting of hydrogen, halogen, hydroxyl, carboxyl, sulfo, nitro, cyano, $C_{1-4}$ alkyl, $C_{1-4}$ alkoxy, ureido and amido;

$(Z_1)_{0-1}$ and $(Z_2)_{0-1}$ each independently are 0 to 1 reactive group, and each of $Z_1$ and $Z_2$ independently is selected from the group consisting of $-SO_2-U$, $-CONH-(CH_2)_k-SO_2-U$, $-O-(CH_2)_s-CONH-(CH_2)_t-SO_2-U$, β-thiosulfatoethylsulfonyl and $-N(R')-U'$.

U is $-CH_2CH_2W$, $-CH=CH_2$ and $-CH_2CH_2OH$;

W is a leaving group eliminable by a base, which is $-Cl$, $-OSO_3H$, $-OPO_3H$, quaternary ammonium, pyridine, carboxypyridinium, methylpyridinium or carbonamidopyridinium;

U' is α,β-halopropionyl, α-haloacryloyl, β-halopropionyl or α-haloacryloyl;

R' is hydrogen or $C_{1-4}$ alkyl; and k, n, s and t each independently are 2, 3 or 4.

In the reactive dyestuff of the formula (I) according to the present invention, $A_1$ and $A_2$ may each independently be a benzene component. Preferably, $A_1$ and $A_2$ each independently are represented by the following formula (* represents a position for connecting to an amino group),

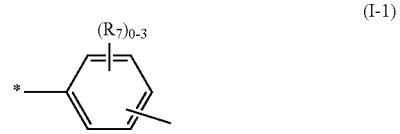

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

In the reactive dyestuff of the formula (I) according to the present invention, $A_1$ and $A_2$ may each independently be a monoazo component. Preferably, $A_1$ and $A_2$ each independently are represented by the following formulas (* represents a position for connecting to an amino group),

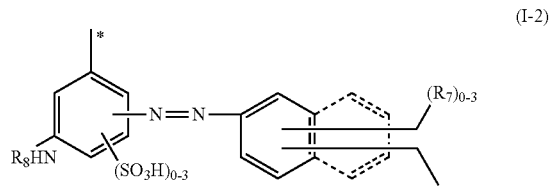

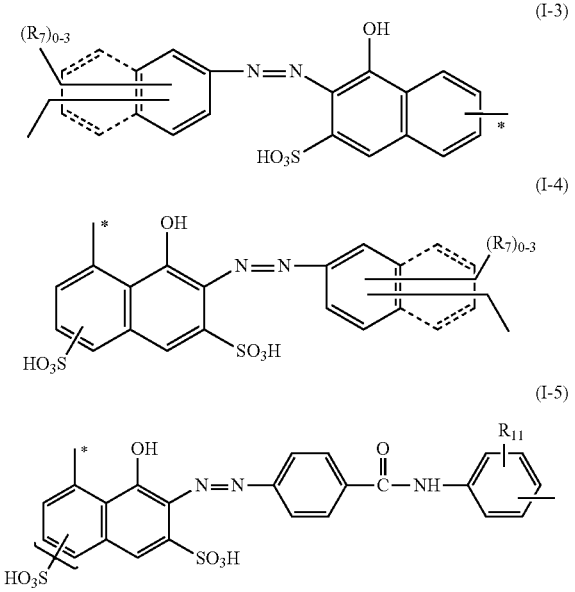

(I-3)

(I-4)

(I-5)

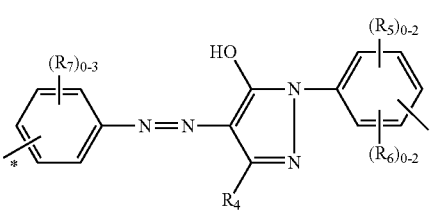

(I-6)

wherein, $R_4$, $(R_5)_{0-2}$, $(R_6)_{0-2}$ and $(R_7)_{0-3}$ are defined as above;

$R_8$ is hydrogen, $C_{1-4}$ alkyl, $C_{2-4}$ alkylcarboxyl or $C_{1-4}$ alkyl substituted by hydroxyl, cyano, acetyl, amido, carboxyl, sulfo, methoxycarbonyl, ethoxycarbonyl or acetoxy; and $R_{11}$ is hydrogen, halogen, hydroxyl, carboxyl, sulfo, amino, nitro, cyano, acetylamino, ureido, $C_{1-4}$ alkyl and $C_{1-4}$ alkoxy.

In the reactive dyestuff of the formula (I) according to the present invention, $A_1$ and $A_2$ may each independently be a disazo component. Preferably, $A_1$ and $A_2$ each independently are represented by the following formulas (* represents a position for connecting to an amino group),

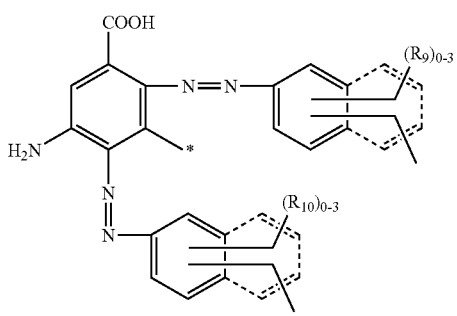

(I-7)

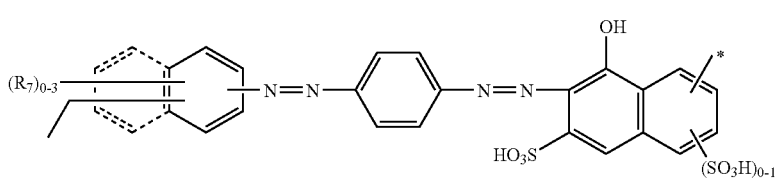

(I-8)

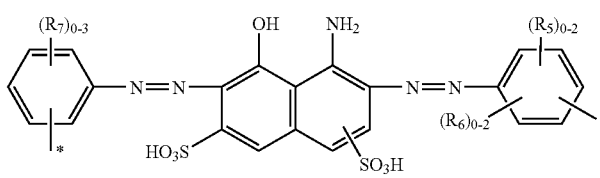

(I-9)

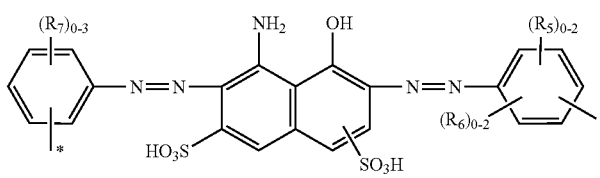

(I-10)

wherein $(R_5)_{0-2}$, $(R_6)_{0-2}$ and $(R_7)_{0-3}$ are defined as above;

$(R_9)_{0-3}$ is 0 to 3 identical or different groups, and each of $R_9$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl; and $(R_{10})_{0-3}$ is 0 to 3 identical or different groups, and each of $R_9$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

In the reactive dyestuff of the formula (I) according to the present invention, $A_1$ and $A_2$ may each independently be a polyazo component. Preferably, $A_1$ and $A_2$ each independently are represented by the following formulas (* represents a position for connecting to an amino group),

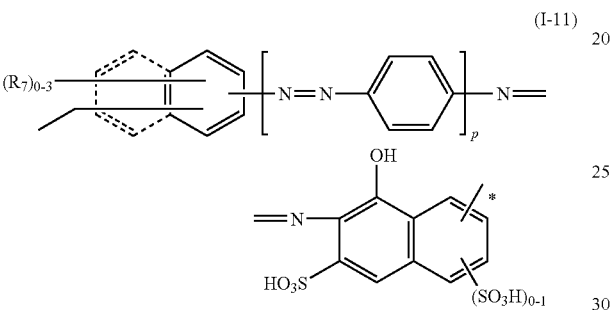

(I-11)

wherein $(R_7)_{0-3}$ is defined as above; and p is 2 or 3.

In the reactive dyestuff of the formula (I) according to the present invention, $A_1$ and $A_2$ may each independently be a metal complex azo component. Preferably, $A_1$ and $A_2$ each independently are represented by the following formulas (* represents a position for connecting to an amino group),

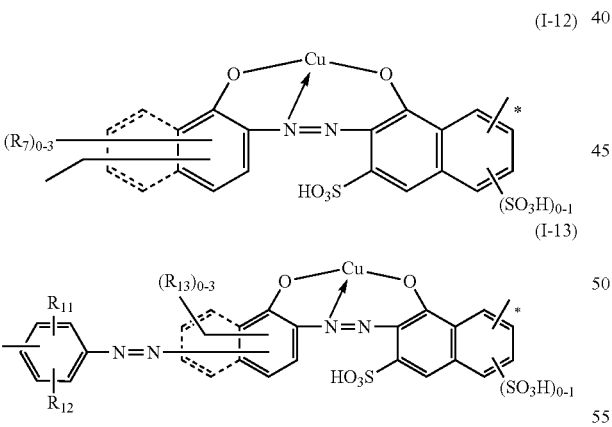

(I-12)

(I-13)

wherein $(R_7)_{0-3}$ and $R_{11}$ are defined as above;

$R_{12}$ is hydrogen, halogen, hydroxyl, carboxyl, sulfo, amino, nitro, cyano, acetylamino, ureido, $C_{1-4}$ alkyl and $C_{1-4}$ alkoxy; and $(R_{13})_{0-3}$ is 0 to 3 identical or different groups, and each of $R_7$ independently is selected from the group consisting of halogen, hydroxyl, carboxyl, sulfo, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

In the reactive dyestuff of the formula (I) according to the present invention, $A_1$ and $A_2$ may each independently be a monoazo component. More preferably, $A_1$ and $A_2$ each independently are represented by the following formulas (* represents a position for connecting to an amino group),

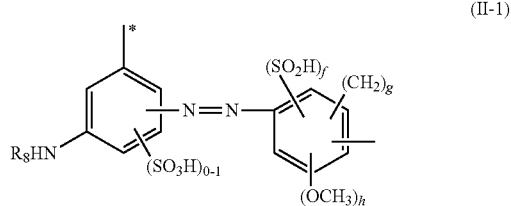

(II-1)

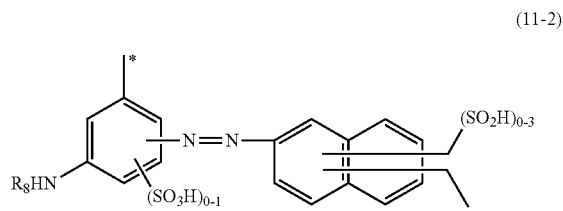

(II-2)

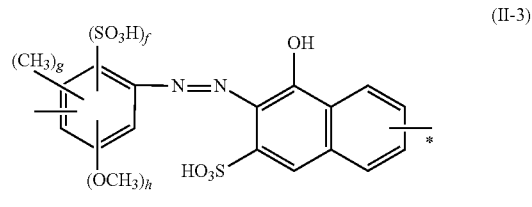

(II-3)

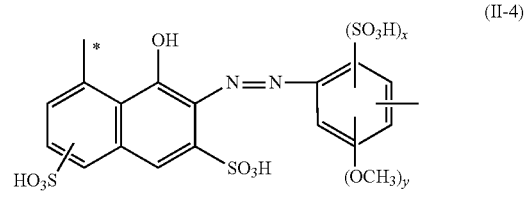

(II-4)

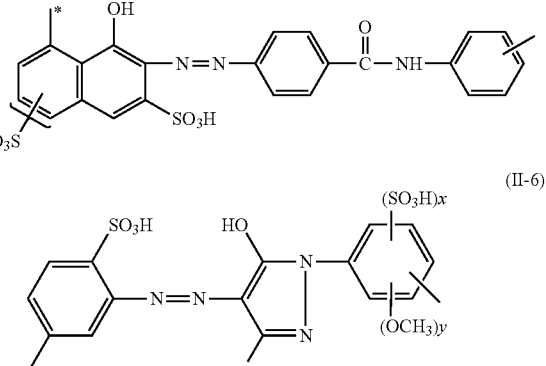

(II-5)

(II-6)

wherein $R_8$ is defined as above; f, g and h are integers independent of one another between 0 to 2, and f+g+h is an integer between 0 to 3; and x and y are integers independent of one another between 0 to 2, and x+y is an integer between 0 to 3.

In the reactive dyestuff of the formula (I) according to the present invention, $A_1$ and $A_2$ may each independently be a disazo component. More preferably, $A_1$ and $A_2$ each independently are represented by the following formulas (* represents a position for connecting to an amino group),

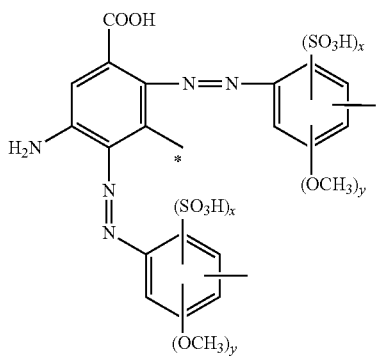
(II-7)

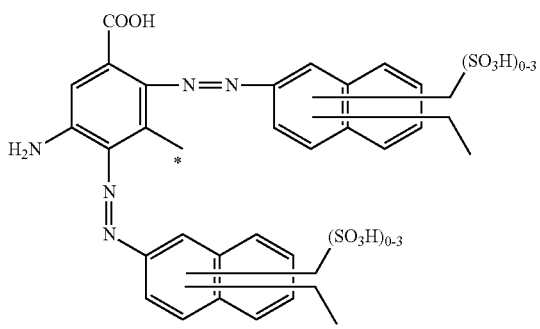
(II-8)

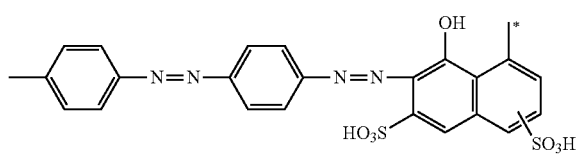
(II-9)

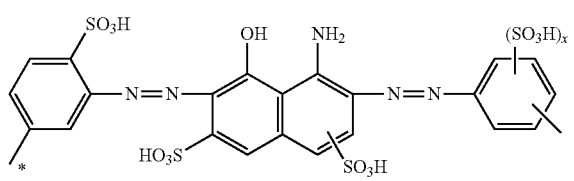
(II-10)

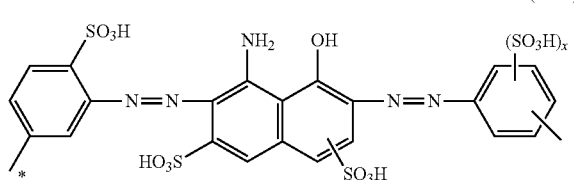
(II-11)

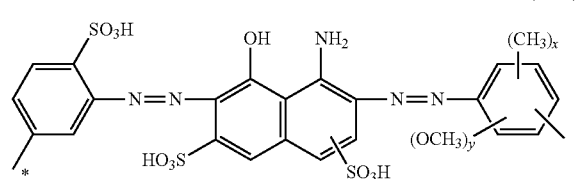
(II-12)

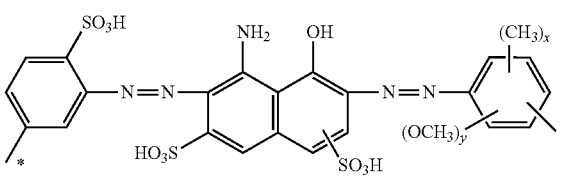
(II-13)

wherein x and y are defined as above.

In the reactive dyestuff of the formula (I) according to the present invention, $A_1$ and $A_2$ may each independently be a metal complex azo component. More preferably, $A_1$ and $A_2$ each independently are represented by the following formulas (* represents a position for connecting to an amino group),

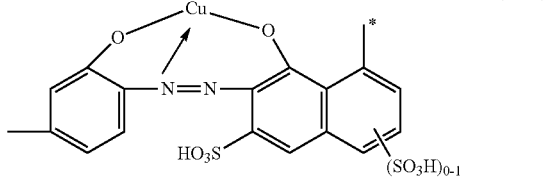
(II-14)

For convenience in description, the compound is expressed as free acid in the specification. When produced or used, the dyestuffs of the present invention are often presented as water-soluble salts. The salts suitable for the present invention may be the alkaline metal salts, alkaline earth metal salts, ammonium salts or organic amine salts; preferably, the salts are sodium salts, potassium salts, lithium salts, ammonium salts or triethanolamine salts.

The dyestuffs according to the present invention can be prepared by a conventional method. The synthetic routine for preparing the dyestuffs is not strictly limited. For example, a chromophore may be first prepared and then a desired dyestuff is synthesized, or a chromophore may be synthesized in the process for preparing a dyestuff.

The dyestuffs of the present invention can be applied to dye and print many kinds of fiber materials, particularly cellulose fiber materials and cellulose-included fiber materials. The examples of the fiber materials are not limited. It can be natural or regenerated cellulose fibers, such as cotton, hemp, linen, jute, ramie, mucilage rayon, as well as cellulose-included fiber materials. The dyestuffs of the present invention can also be applied to dye and print fiber blended fabrics containing hydroxyl groups.

The dyestuffs of the present invention can be applied to the fiber material and fixed on the fiber in various ways, particularly in the form of aqueous dyestuff solutions and printing pastes. They can be applied to dye and print cellulose fibers by exhaustion dyeing, continuous dyeing, cold-pad-batch dyeing, printing or digital printing.

The dyeing or printing of the present invention can be proceeded by the conventional and usually known method. For example, exhaustion dyeing is applied by using separately or mixing the well-known inorganic salts (e.g. sodium sulfate and sodium chloride) and acid-binding agents (e.g. sodium carbonate, sodium hydroxide). The amount of inorganic salts and alkali does not matter. The inorganic salts and alkali can be added either once or several times into the dyeing bath through traditional methods. In addition, dyeing assistant agents (such as a leveling agent, suspending agent and so on) can be added according to conventional methods. The range of dyeing temperature is from 40° C. to 90° C. Preferably, the temperature for dyeing is from 50° C. to 70° C.

In the cold-pad-batch dyeing method, the material is padded by using the well-known inorganic salts (e.g. sodium sulfate and sodium chloride) and acid-binding agents (e.g. sodium carbonate, sodium hydroxide). The padded fabric is rolled and stored at room temperature to allow dye fixation to take place.

In the continuous dyeing method, two different methods exist. In the single-bath pad dyeing method, the material is padded according to the conventional method in the mixture of the well-known acid-binding agents (e.g. sodium carbonate or sodium bicarbonate) and the pad liquid. The resultant material is then dried and color fixed by baking or steaming.

In the two-bath pad dyeing method, the material is padded with a dye liquid and then dealt by a known inorganic neutral salt (e.g., sodium sulfate or sodium silicate). The dealt material is preferably dried and color-fixed by baking or steaming in the usual manner.

In the textile printing method, such as the single printing method, the material is printed by using printing paste containing the known acid-binding agent (e.g., sodium bicarbonate) and is dried and color-fixed by baking or steaming.

In the two-phase printing method, the material is dipped in a solution containing inorganic neutral salt (e.g., sodium chloride) and the known acid-binding agent (e.g., sodium hydroxide or sodium carbonate) in a high temperature of 90° C. or above to fix the color.

The dyeing or printing methods employed in the process of the present invention are not limited to the above methods.

Other objects, advantages, and novel features of the invention will become more apparent from the following detailed description when taken in conjunction with the accompanying drawings.

BRIEF DESCRIPTION OF THE DRAWINGS

None.

DETAILED DESCRIPTION OF THE PREFERRED EMBODIMENT

For convenience in the statement, the following examples are exemplified for a more concrete description. Many examples have been used to illustrate the present invention. The examples sited below should not be taken as a limit to the scope of the invention. The compounds are represented in the form of free acid. However, in practice, they often exist as metallic salts, and most likely alkaline metallic salts, particularly sodium salts. Unless otherwise stated, the parts and percentages used in the following examples are based on weight, and the temperature is in Celsius degrees (° C.).

EXAMPLE 1

(a) 18.8 parts of cyanuric chloride are dispersed in 200 parts of 0° C. water, followed by the addition of a solution containing 31.9 parts of 4-amino-5-hydroxy-2,7-naphthalenedisulfonic acid. Next, the pH value of the reaction solution is adjusted to a range of 1 to 3 by the addition of 15% $Na_2CO_3$ (aq), and its temperature is maintained below 5° C. to perform reaction for 2 hours. Finally, the reaction solution is filtered and the filtrate is reserved.

(b) 28.1 parts of 4-(β-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, the above filtrate prepared in the step (a) is added therein, and the pH value of the reaction solution is adjusted to a range of 6 to 8 by the addition of $Na_2CO_3$. The reaction is performed for 3 hours to obtain a red product.

(c) To the above aqueous solution prepared in the step (b), 10.7 parts of 4-(2-(methylamino)ethylsulfonyl)aniline are added. Next, the pH value of the reaction solution is adjusted to a range of 7 to 9 by the addition of $Na_2CO_3$ powder at a temperature of 20-35° C. After the reaction is accomplished, a red product of the formula (1) is obtained.

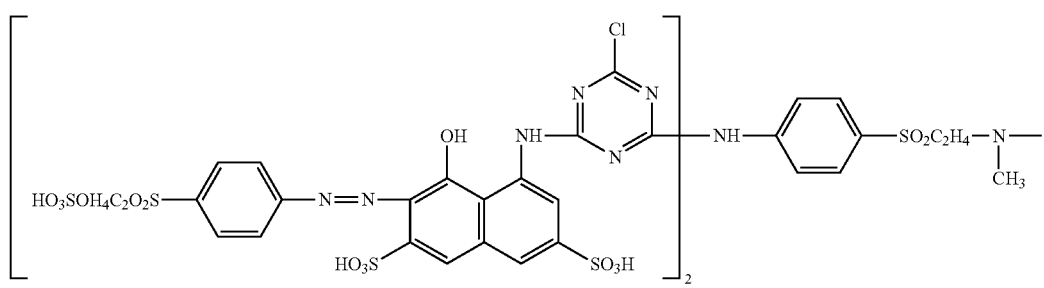

(1)

EXAMPLE 2

(a) 18.8 parts of cyanuric chloride are dispersed in 200 parts of 0° C. water, followed by the addition of 18.8 parts of 2,4-diaminobenzene-1-sulfonic acid powder. Next, the pH value of the reaction solution is adjusted to a range of 1 to 3 by the addition of 15% $Na_2CO_3$ (aq), and its temperature is maintained below 5° C. to perform reaction for 2 hours.

(b) 36.1 parts of 1-aminobenzene-4-(b-sulfatoethyl sulfone)-2-sulfonic acid and 30 parts of 32% HCl (aq) are added into 150 parts of 0° C. water with thorough stirring, followed by the addition of 7.2 parts of sodium nitrite. The reaction solution is stirred until the diazotization is accomplished. Subsequently, the above solution prepared in the step (a) is added therein, and the pH value of the reaction solution is adjusted to a range of 6 to 7 by the addition of $Na_2CO_3$. The reaction is performed for 3 hours to obtain an orange product.

(c) To the above aqueous solution prepared in the step (b), 12.2 parts of 2-methoxy-5-(2-(methylamino)ethylsulfonyl) aniline are added. Next, the pH value of the reaction solution is adjusted to a range of 7 to 9 by the addition of $Na_2CO_3$ powder at a temperature of 20-35° C. After the reaction is accomplished, an orange product of the formula (2) is obtained.

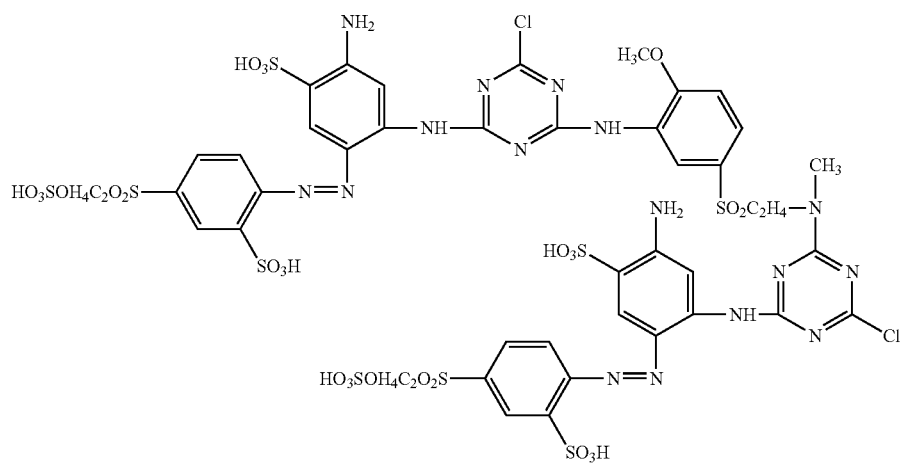

(2)

EXAMPLE 3

(a) 18.8 parts of cyanuric chloride are dispersed in 200 parts of 0° C. water, followed by the addition of a solution containing 31.9 parts of 4-amino-5-hydroxy-2,7-naphthalenedisulfonic acid. Next, the pH value of the reaction solution is adjusted to a range of 1 to 3 by the addition of 15% $Na_2CO_3$ (aq), and its temperature is maintained below 5° C. to perform reaction for 2 hours. Finally, the reaction solution is filtered and the filtrate is reserved.

(b) 28.1 parts of 4-(β-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, the above filtrate prepared in the step (a) is added therein, and the pH value of the reaction solution is adjusted to a range of 6 to 8 by the addition of $Na_2CO_3$. The reaction is performed for 3 hours to obtain a red product.

(c) To the above aqueous solution prepared in the step (b), 12.2 parts of 2-(2-(4-aminophenylsulfonyl)ethylamino)ethanol are added. Next, the pH value of the reaction solution is adjusted to a range of 7 to 9 by the addition of $Na_2CO_3$ powder at a temperature of 20-35° C. After the reaction is accomplished, a red product of the formula (1) is obtained.

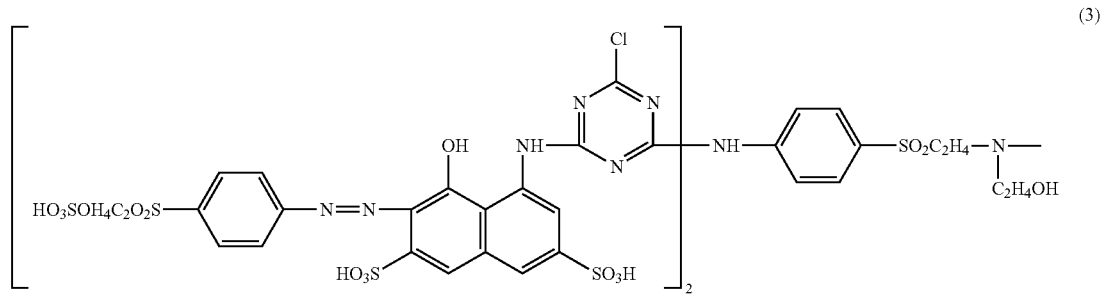

(3)

EXAMPLES 4-27

According to the synthetic methods of Examples 1-3, the compounds (4)-(27) can be obtained, shown as follows.

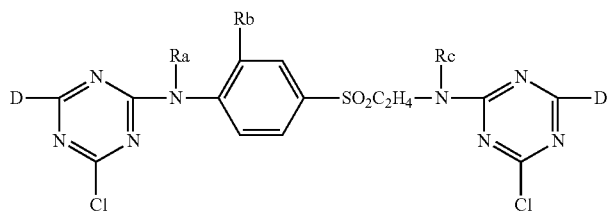
| Example (Formula) | D | Ra | Rb | Rc |
|---|---|---|---|---|
| 4 | 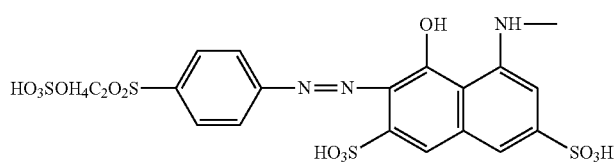 | H | H | CH₃ |
| 5 | 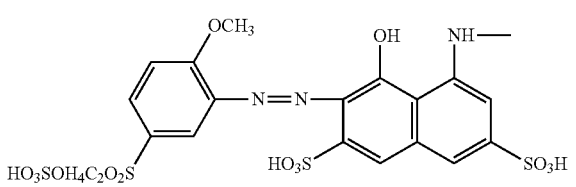 | H | H | CH₃ |
| 6 | 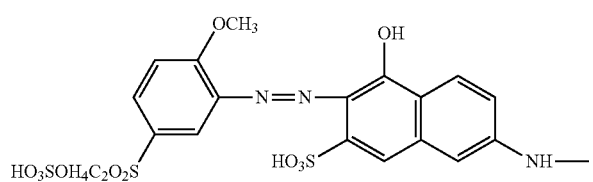 | H | H | CH₃ |
| 7 | 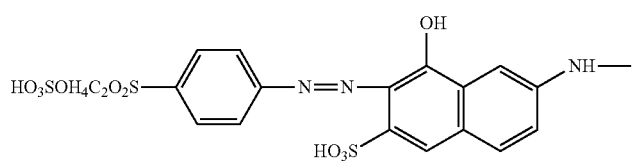 | H | H | CH₃ |
| 8 | 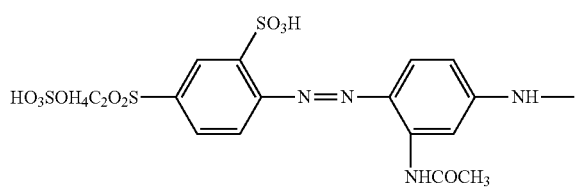 | H | H | CH₃ |
| 9 | 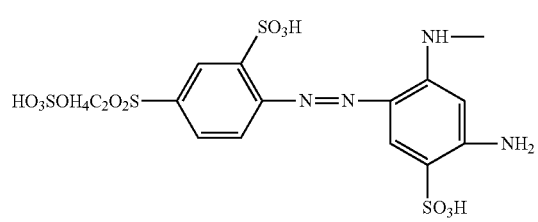 | H | H | CH₃ |
| 10 | 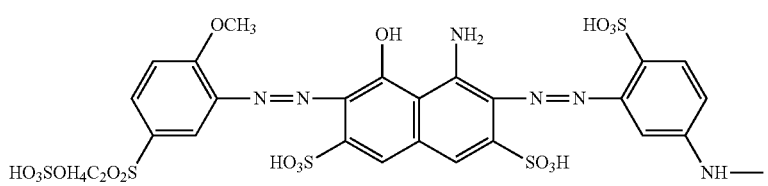 | H | H | CH₃ |

-continued
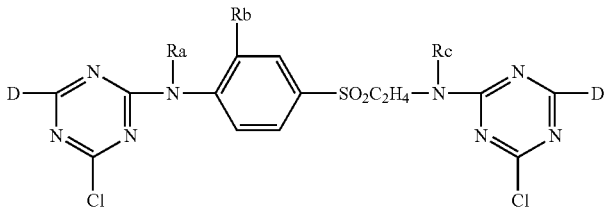
| Example (Formula) | D | Ra | Rb | Rc |
|---|---|---|---|---|
| 11 | 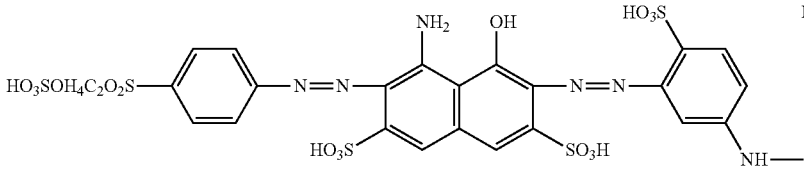 | H | H | $CH_3$ |
| 12 | 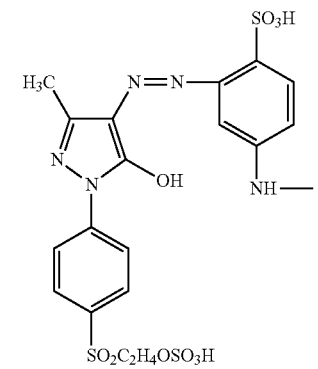 | H | H | $CH_3$ |
| 13 | 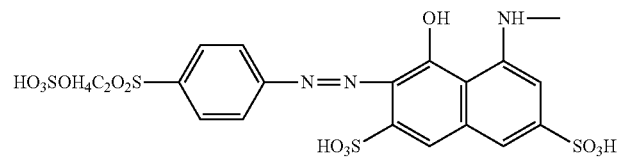 | H | H | $C_2H_4OH$ |
| 14 | 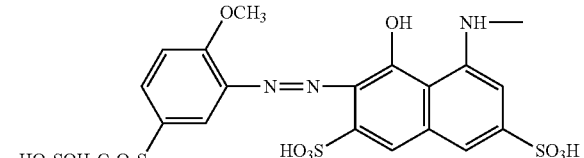 | H | H | $C_2H_4OH$ |
| 15 | 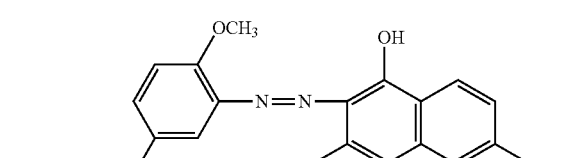 | H | H | $C_2H_4OH$ |
| 16 | 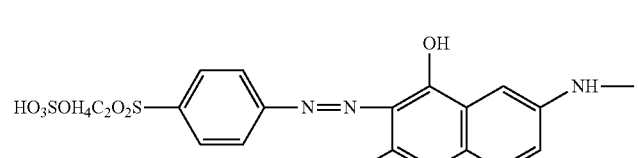 | H | H | $C_2H_4OH$ |

-continued
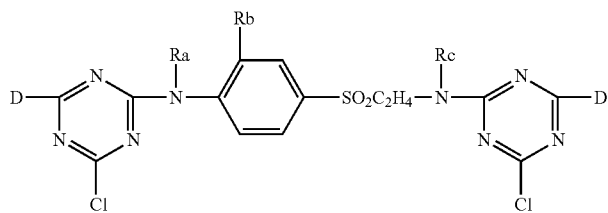
| Example (Formula) | D | Ra | Rb | Rc |
|---|---|---|---|---|
| 17 | 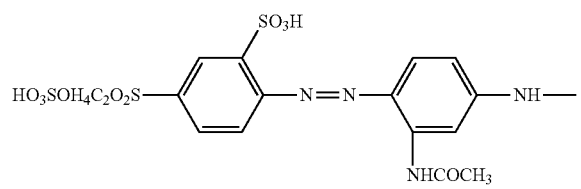 | H | H | C$_2$H$_4$OH |
| 18 | 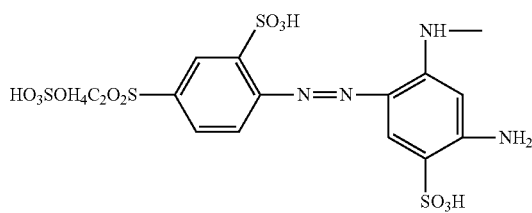 | H | H | C$_2$H$_4$OH |
| 19 | 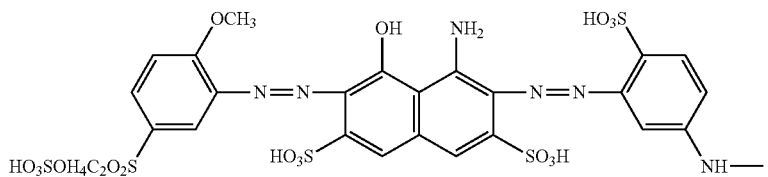 | H | H | C$_2$H$_4$OH |
| 20 | 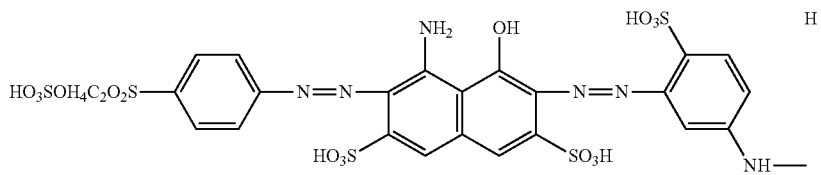 | H | H | C$_2$H$_4$OH |
| 21 | 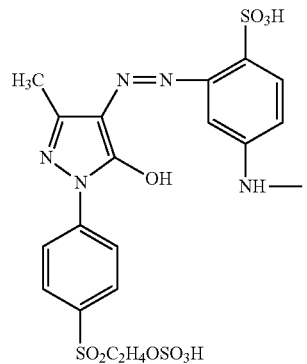 | H | H | C$_2$H$_4$OH |

-continued
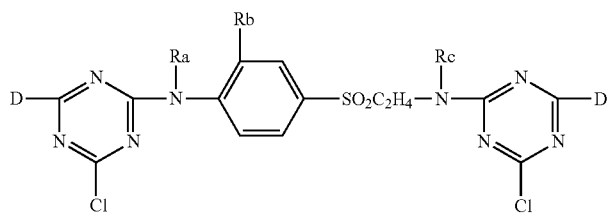
| Example (Formula) | D | Ra | Rb | Rc |
|---|---|---|---|---|
| 22 | 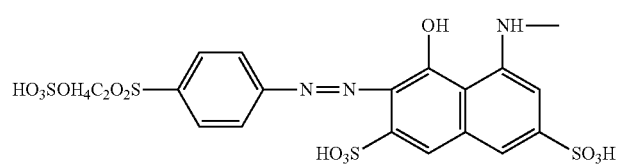 | H | H | C₂H₅ |
| 23 | 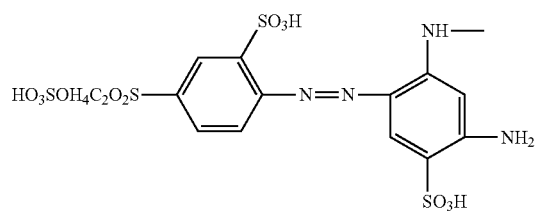 | H | H | C₂H₅ |
| 24 | 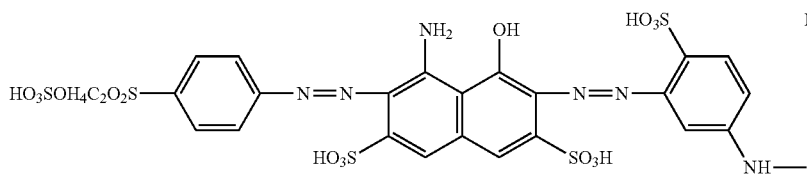 | H | H | C₂H₅ |
| 25 | 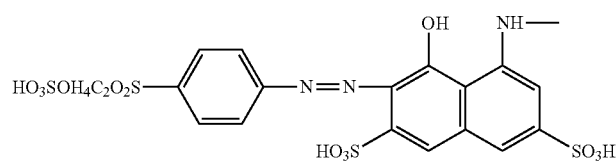 | H | H | C₆H₅ |
| 26 | 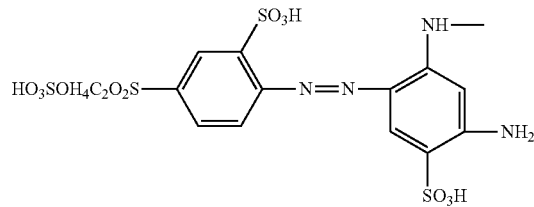 | H | H | C₆H₅ |
| 27 | 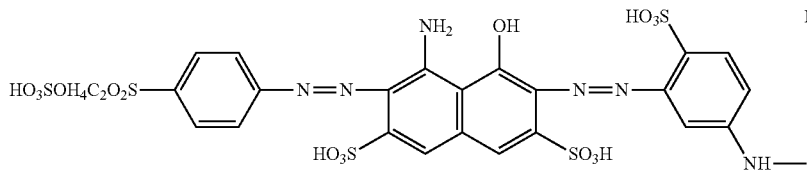 | H | H | C₆H₅ |

EXAMPLES 28-49

According to the synthetic methods of Examples 1-3, the compounds (28)-(49) can be obtained, shown as follows.

[Structure: central template showing a triazine-aryl-SO₂C₂H₄-N(Rf)-triazine system with substituents Rd, Re, Rf, and D groups]

| Example | Rd | Re | Rf |
|---|---|---|---|
| | H | OCH₃ | CH₃ |
| (Formula) | | D | |
| 28 | HO₃SOH₄C₂O₂S—C₆H₄—N=N—[1-OH, 8-NH—, 3,6-(SO₃H)₂-naphthalene] | | |
| 29 | [2-OCH₃, 5-(SO₂C₂H₄OSO₃H)-C₆H₃]—N=N—[1-OH, 8-NH—, 3,6-(SO₃H)₂-naphthalene] | | |
| 30 | [2-SO₃H, 4-(SO₂C₂H₄OSO₃H)-C₆H₃]—N=N—[2-NH—, 4-NH₂, 5-SO₃H-C₆H₂] | | |
| 31 | HO₃SOH₄C₂O₂S—C₆H₄—N=N—[8-NH₂, 1-OH, 3,6-(SO₃H)₂-naphthalene]—N=N—[2-SO₃H, 5-NH—-C₆H₃] | | |

| Example | Rd | Re | Rf |
|---|---|---|---|
| | C₂H₅ | H | CH₃ |
| (Formula) | | D | |
| 32 | HO₃SOH₄C₂O₂S—C₆H₄—N=N—[8-NH₂, 1-NH—, 3,6-(SO₃H)₂-naphthalene] | | |

33
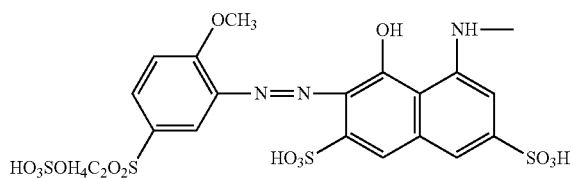
34
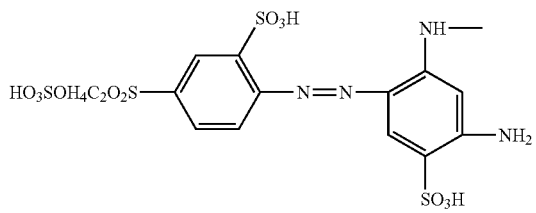
35
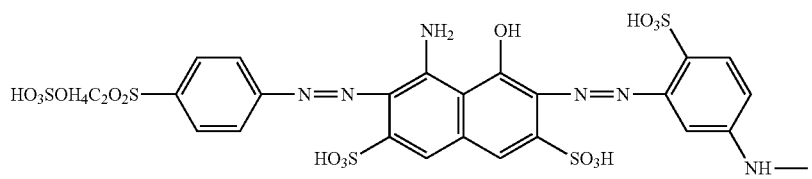
| Example | Rd | Re | Rf |
|---|---|---|---|
|  | H | OCH₃ | C₂H₄OH |
| (Formula) |  | D |  |
36
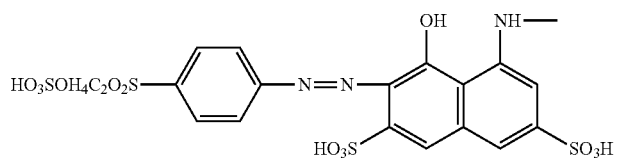
37
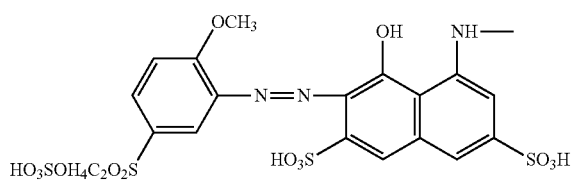
38
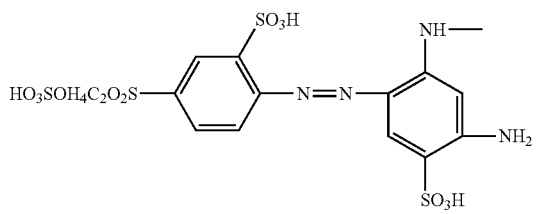
39
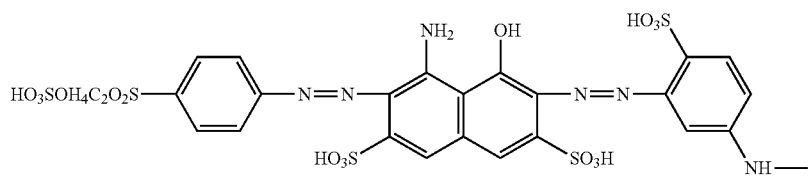

-continued

| Example | Rd<br>C$_2$H$_5$ | Re<br>H | Rf<br>C$_2$H$_4$OH |
|---|---|---|---|
| (Formula) | | D | |

40

HO$_3$SOH$_4$C$_2$O$_2$S—⟨C$_6$H$_4$⟩—N=N—[naphthalene with OH, NH—, HO$_3$S, SO$_3$H]

41

HO$_3$SOH$_4$C$_2$O$_2$S—⟨C$_6$H$_3$(OCH$_3$)⟩—N=N—[naphthalene with OH, NH—, HO$_3$S, SO$_3$H]

42

HO$_3$SOH$_4$C$_2$O$_2$S—⟨C$_6$H$_3$(SO$_3$H)⟩—N=N—⟨C$_6$H$_2$(NH—)(NH$_2$)(SO$_3$H)⟩

43

HO$_3$SOH$_4$C$_2$O$_2$S—⟨C$_6$H$_4$⟩—N=N—[naphthalene with NH$_2$, OH, HO$_3$S, SO$_3$H]—N=N—⟨C$_6$H$_3$(HO$_3$S)(NH—)⟩

| Example | Rd<br>OCH$_3$ | Re<br>H | Rf<br>C$_2$H$_5$ |
|---|---|---|---|
| (Formula) | | D | |

44

HO$_3$SOH$_4$C$_2$O$_2$S—⟨C$_6$H$_4$⟩—N=N—[naphthalene with OH, NH—, HO$_3$S, SO$_3$H]

45

HO$_3$SOH$_4$C$_2$O$_2$S—⟨C$_6$H$_3$(SO$_3$H)⟩—N=N—⟨C$_6$H$_2$(NH—)(NH$_2$)(SO$_3$H)⟩

| Example | Rd<br>C$_2$H$_5$ | Re<br>H | Rf<br>C$_2$H$_5$ |
|---|---|---|---|
| (Formula) | | D | |

46

HO$_3$SOH$_4$C$_2$O$_2$S—⟨C$_6$H$_4$⟩—N=N—[naphthalene with OH, NH—, HO$_3$S, SO$_3$H]

| | | | |
|---|---|---|---|
| 47 | | | 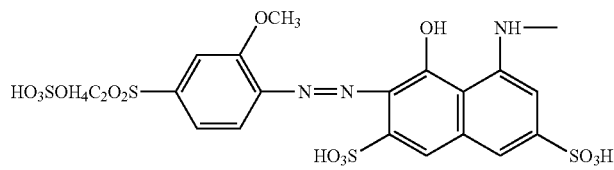 |
| Example (Formula) | Rd H | Re H | Rf C$_2$H$_5$ |
| | | D | |
| 48 | | | 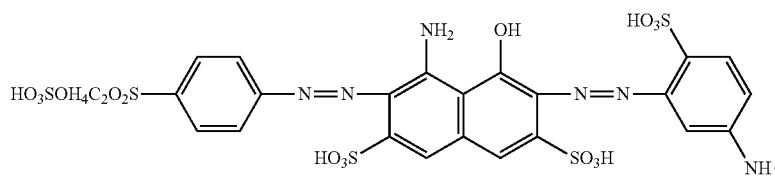 |
| Example (Formula) | Rd OCH$_3$ | Re H | Rf 0 |
| | | D | |
| 49 | | | 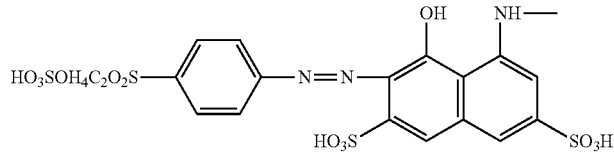 |

EXAMPLE 50

(a) 9.4 parts of cyanuric chloride are dispersed in 100 parts of 0° C. water, followed by the addition of a solution containing 16 parts of 4-amino-5-hydroxy-2,7-naphthalenedisulfonic acid. Next, the pH value of the reaction solution is adjusted to a range of 1 to 3 by the addition of 15% Na$_2$CO$_3$ (aq), and its temperature is maintained below 5° C. to perform reaction for 2 hours. Finally, the reaction solution is filtered and the filtrate is reserved.

(b) 14 parts of 4-(β-sulfatoethylsulfone) aniline and 12.8 parts of 32% HCl (aq) are added into 150 parts of 0° C. water with thorough stirring to form a dispersion solution, followed by the addition of 3.6 parts of sodium nitrite. The temperature of the solution is controlled in a range of 0° C. to 5° C. until the diazotization is accomplished. Subsequently, the above filtrate prepared in the step (a) is added therein, and the pH value of the reaction solution is adjusted to a range of 6 to 8 by the addition of Na$_2$CO$_3$. The reaction is performed for 3 hours to obtain a red product.

To the above aqueous solution prepared in the step (b), 12.2 parts of 2-(2-(4-aminophenylsulfonyl)ethylamino)ethanol are added. Next, the pH value of the reaction solution is adjusted to a range of 5 to 7 by the addition of Na$_2$CO$_3$ powder at a temperature of 20-35° C. After the reaction is accomplished, a red product of the formula (50') is obtained.

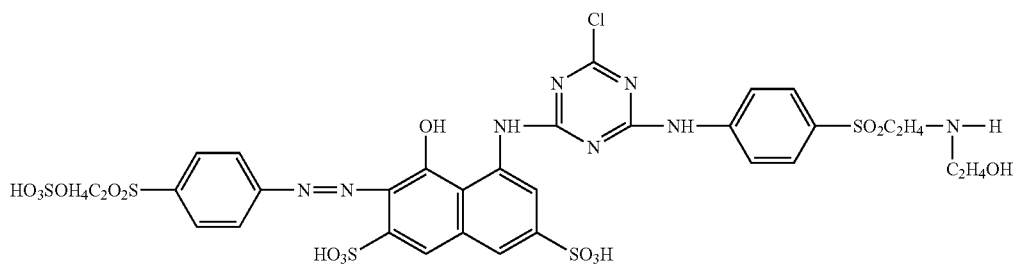

(50')

(a) 9.4 parts of cyanuric chloride are dispersed in 100 parts of 0° C. water, followed by the addition of a solution containing 16 parts of 4-amino-5-hydroxy-2,7-naphthalenedisulfonic acid. Next, the pH value of the reaction solution is adjusted to a range of 1 to 3 by the addition of 15% Na$_2$CO$_3$ (aq), and its temperature is maintained below 5° C. to perform reaction for 2 hours. Finally, the reaction solution is filtered and the filtrate is reserved.

(b) 15.6 parts of 2-aminoanisole-4-vinyl sulfone and 12.8 parts of 32% HCl (aq) are added into 150 parts of 0° C. water with thorough stirring to form a dispersion solution, followed by the addition of 3.6 parts of sodium nitrite. The temperature of the solution is controlled in a range of 0° C. to 5° C. until the diazotization is accomplished. Subsequently, the above filtrate prepared in the step (a) is added therein, and the pH value of the reaction solution is adjusted to a range of 7.5 to 8.5 by the addition of $Na_2CO_3$. After the reaction is accomplished, the pH value of the reaction solution is adjusted to a range of 5 to 6 by the addition of 32% HCl (aq) to obtain a red product of the formula (50).

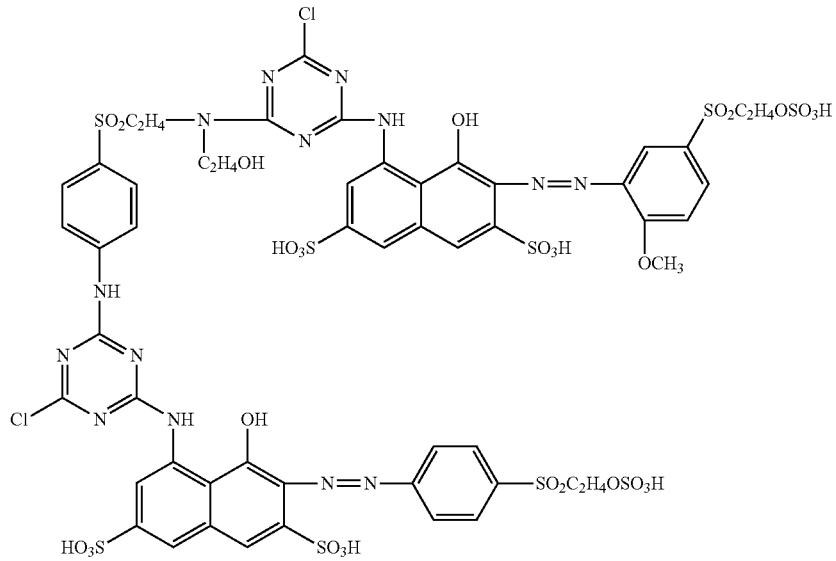

(50)

30

EXAMPLES 51-55

According to the synthetic method of Example 50, the compounds (51)-(55) can be obtained, shown as follows.

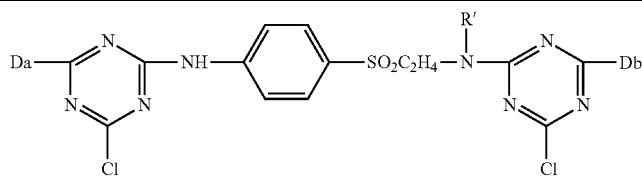

| Example (Formula) | | R' (CH$_3$) |
|---|---|---|
| 51 | Da | 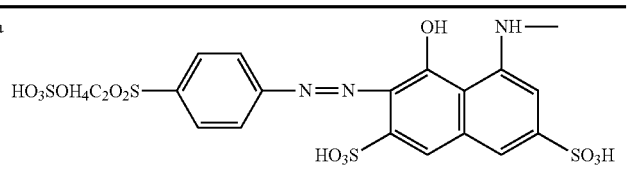 |
| | Db | 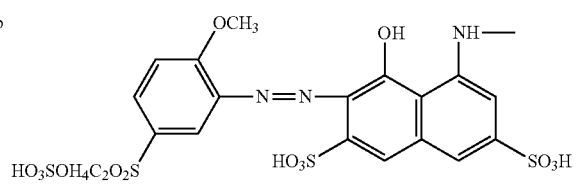 |
| 52 | Da | 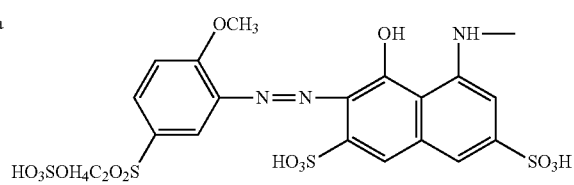 |

-continued

| | | |
|---|---|---|
| | Db | 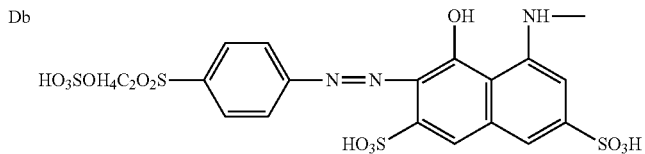 |
| 53 | Da | 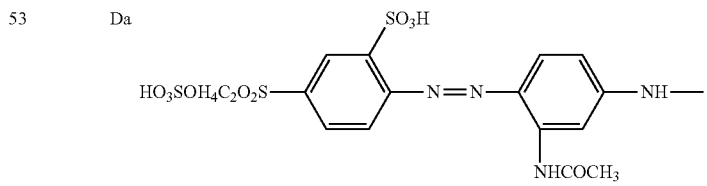 |
| | Db | 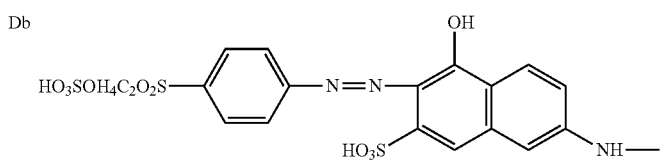 |

| Example (Formula) | | R' (C$_2$H$_4$OH) |
|---|---|---|
| 54 | Da | 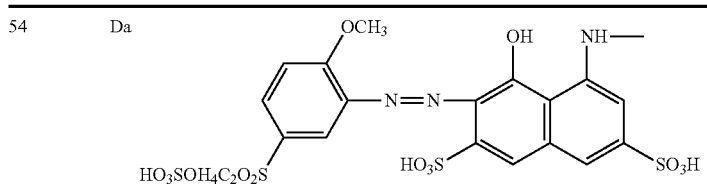 |
| | Db | 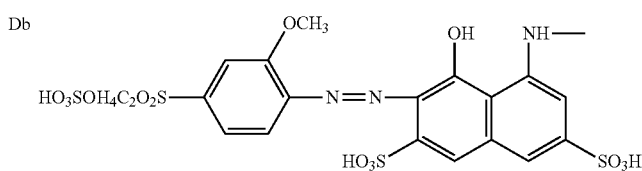 |
| 55 | Da | 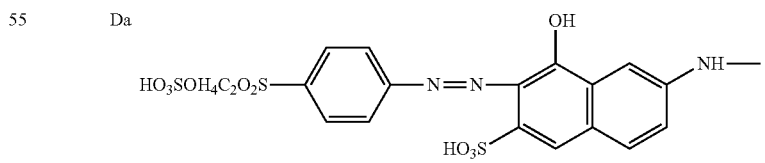 |
| | Db | 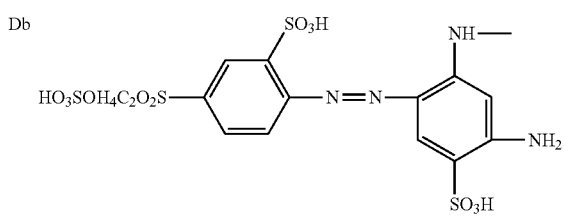 |

TESTING EXAMPLE 1

One part of the dyestuff prepared in Example 1 is dissolved in 100 parts of distilled water to prepare a dye solution. Twenty parts of the dye solution are poured into a dyeing vessel. Subsequently, 4.8 parts of Glauber's Salt are added into the dyeing vessel and then distilled water is added therein to make up the total amount of the dye solution to be 75 parts in total. After that, 5 parts of 320 g/l soda ash are added to the dyeing vessel. Four parts of woven cotton fabric are put into the dye solution, followed by covering and locking the dyeing vessel, and the dyeing vessel is shaken to survey the dye. Then, the dyeing vessel is put into a thermostatic bath, followed by switching on the rotating knob. The temperature is raised to 60° C. in 30 minutes and then kept for 60 minutes. After dyeing is accomplished, the dyed fabric is taken out and washed with cold water. Finally, after washing, dehydration and drying, a red fabric with good build up and good tinctorial yield is obtained.

TESTING EXAMPLE 2

Three parts of the dyestuff prepared in Example 1 are dissolved in 100 mL of water to obtain a 30 parts/1 padding liquor. Twenty-five ml of alkali solvent (taking 15 ml/l of NaOH and 30 parts/1 of Glauber's salt) is added to the padding liquor and stirred thoroughly. The resultant solution is then put into a pad roller machine. The cotton fabric is padded by the roller pad machine, and batched for 4 hours at room temperature. The obtained red fabric is sequentially washed with cold water, boiling water for 10 minutes, boiling non-ionic detergent for 10 minutes, again with cold water and then dried to obtain a red fabric with good build up and good tinctorial yield.

TESTING EXAMPLE 3

One hundred parts of Urea, 1 part of m-nitrobenzene sulfonic acid sodium salt, 20 parts of sodium bicarbonate, 55 parts of sodium alginate, and 815 parts of lukewarm water (1000 parts in total) are stirred in a vessel to obtain a completely homogeneous printing paste.

Three parts of the dyestuff prepared in Example 10 are sprayed in 100 parts of the above printing paste and stirred to make a homogeneous colored paste. An adequate size piece of twilled cotton fabric is covered with a 100 mesh 45°-twilled printing screen and then painted with the colored paste on the printing screen to give a colored fabric.

This colored fabric is placed in an oven at 65° C. for 5 minutes until dry and then put into a steaming oven using saturated steam of 102-105° C. for 10 minutes.

The obtained red fabric is sequentially washed with cold water, boiling water for 10 minutes, boiling non-ionic detergent for 10 minutes, again with cold water and then dried to obtain a red fabric with good build up and good tinctorial yield.

Accordingly, the technology according to the present invention achieves the objects of the invention and conforms to the patent requirements of novelty, inventive step and industrial applicability. Although the present invention has been explained in relation to its preferred examples, it is to be understood that many other possible modifications and variations can be made without departing from the scope of the invention as hereinafter claimed.

What is claimed is:

1. A reactive dyestuff with a N-alkylamino group of the following formula (I),

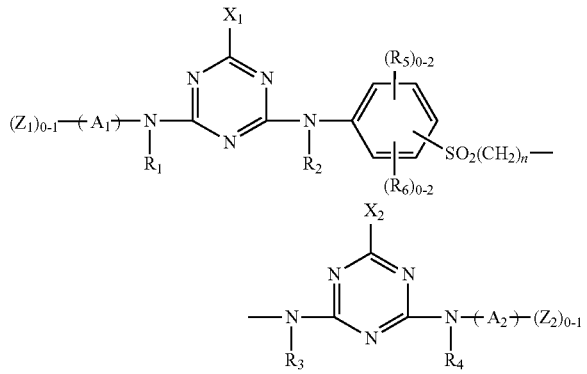

(I)

wherein, $A_1$ and $A_2$ each independently are selected from the group consisting of unsubstituted or substituted monoazo, disazo, polyazo and metal complex azo components;

$X_1$ and $X_2$ each independently are halogen, hydroxyl, quaternary ammonium or $-NR_1R_2$;

$R_1$, $R_2$, $R_3$ and $R_4$ each independently are hydrogen, $C_{1-4}$ alkyl, $C_{1-4}$ alkylcarbonyl, phenyl, nitroso, or $C_{1-4}$ alkyl substituted by halogen, hydroxyl, carboxyl or sulfo;

$(R_5)_{0-2}$ and $(R_6)_{0-2}$ each independently are 0 to 2 identical or different groups, and each of $R_5$ and $R_6$ independently is selected from the group consisting of hydrogen, halogen, hydroxyl, carboxyl, sulfo, nitro, cyano, $C_{1-4}$ alkyl, $C_{1-4}$ alkoxy, ureido and amido;

$(Z_1)_{0-1}$ and $(Z_2)_{0-1}$ each independently are 0 to 1 reactive group and not simultaneously 0 reactive group, and each of $Z_1$ and $Z_2$ independently is selected from the group consisting of $-SO_2-U$, $-CONH-(CH_2)_k-SO_2-U$, $-O-(CH_2)_s-CONH-(CH_2)_t-SO_2-U$, β-thiosulfatoethylsulfonyl and $-N(R')-U'$;

U is $-CH_2CH_2W$, $-CH=CH_2$ and $-CH_2CH_2OH$;

W is a leaving group eliminable by a base, which is $-Cl$, $-OSO_3H$, $-OPO_3H$, quaternary ammonium, pyridine, carboxypyridinium, methylpyridinium or carbonamidopyridinium;

U' is α,β-halopropionyl, α-haloacryloyl, β-halopropionyl or α-haloacryloyl;

R' is hydrogen or $C_{1-4}$ alkyl; and k, n, s and t each independently are 2, 3 or 4.

2. The reactive dyestuff with a N-alkylamino group as claimed in claim 1, wherein $R_1$, $R_2$, $R_3$ and $R_4$ each independently are hydrogen, $C_{1-4}$ alkyl, $C_{1-4}$ alkylcarbonyl, phenyl, nitroso, or $C_{1-4}$ alkyl substituted by hydroxyl or sulfo.

3. The reactive dyestuff with a N-alkylamino group as claimed in claim 1, wherein $(R_5)_{0-2}$ and $(R_6)_{0-2}$ each independently are 0 to 2 identical or different groups, and each of $R_5$ and $R_6$ independently is selected from the group consisting of hydrogen, sulfo, $C_{1-4}$ alkyl and $C_{1-4}$ alkoxy.

4. The reactive dyestuff with a N-alkylamino group as claimed in claim 1, wherein each of $Z_1$ and $Z_2$ independently is selected from the group consisting of $-SO_2-U$, $-CONH-(CH_2)_k-SO_2-U$ and $-N(R')-U'$.

5. The reactive dyestuff with a N-alkylamino group as claimed in claim 1, wherein $A_1$ and $A_2$ each independently are a monoazo component selected from the group consisting of

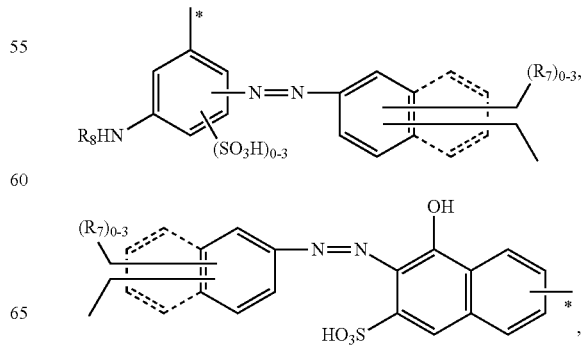

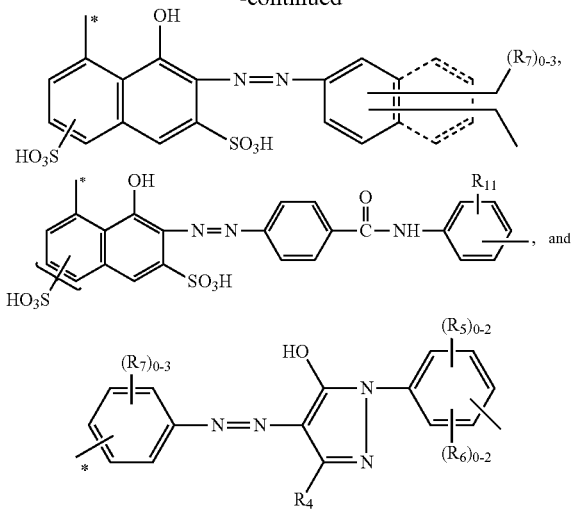

wherein, * represents a position for connecting to the amino group of the formula (I);

$R_4$ is hydrogen, $C_{1-4}$ alkyl, $C_{1-4}$ alkylcarbonyl, phenyl, nitroso, or $C_{1-4}$ alkyl substituted by halogen, carboxyl or sulfo;

$(R_5)_{0-2}$ and $(R_6)_{0-2}$ each independently are 0 to 2 identical or different groups, and each of $R_5$ and $R_6$ independently is selected from the group consisting of hydrogen, halogen, hydroxyl, carboxyl, sulfo, nitro, cyano, $C_{1-4}$ alkyl, $C_{1-4}$ alkoxy, ureido and amido;

$(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_8$ is hydrogen, $C_{1-4}$ alkyl, $C_{2-4}$ alkylcarboxyl or $C_{1-4}$ alkyl substituted by hydroxyl, cyano, acetyl, amido, carboxyl, sulfo, methoxycarbonyl, ethoxycarbonyl or acetoxy; and $R_{11}$ is hydrogen, halogen, hydroxyl, carboxyl, sulfo, amino, nitro, cyano, acetylamino, ureido, $C_{1-4}$ alkyl or $C_{1-4}$ alkoxy.

6. The reactive dyestuff with a N-alkylamino group as claimed in claim 1, wherein $A_1$ and $A_2$ each independently are a disazo component selected from the group consisting of

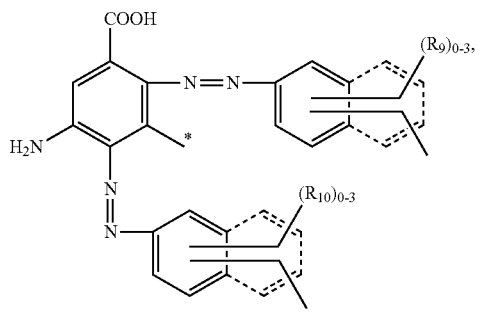

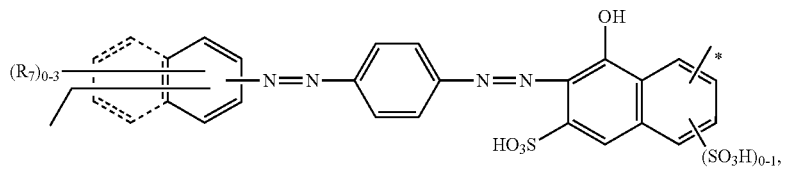

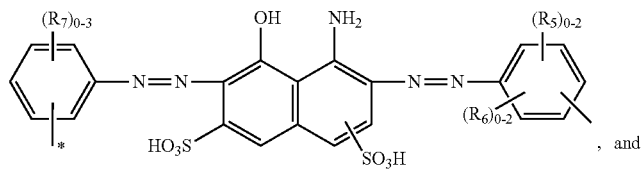

, and

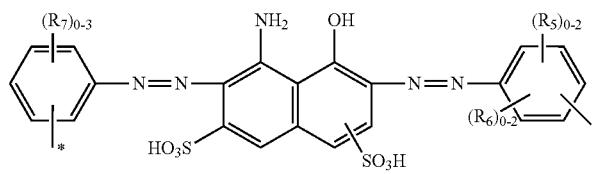

wherein * represents a position for connecting to the amino group of the formula (I);

$(R_5)_{0-2}$ and $(R_6)_{0-2}$ each independently are 0 to 2 identical or different groups, and each of $R_5$ and $R_6$ independently is selected from the group consisting of hydrogen, halogen, hydroxyl, carboxyl, sulfo, nitro, cyano, $C_{1-4}$ alkyl, $C_{1-4}$ alkoxy, ureido and amido;

$(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$(R_9)_{0-3}$ is 0 to 3 identical or different groups, and each of $R_9$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl; and $(R_{10})_{0-3}$ is 0 to 3 identical or different groups, and each of $R_{10}$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

7. The reactive dyestuff with a N-alkylamino group as claimed in claim 1, wherein $A_1$ and $A_2$ each independently are a polyazo component of the following formula,

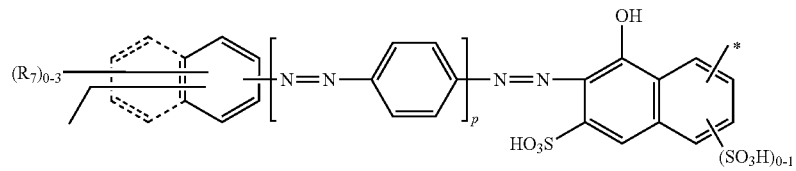

wherein * represents a position for connecting to the amino group of the formula (I);

$(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl; and p is 2 or 3.

8. The reactive dyestuff with a N-alkylamino group as claimed in claim 1, wherein $A_1$ and $A_2$ each independently are a metal complex azo component selected from the group consisting of

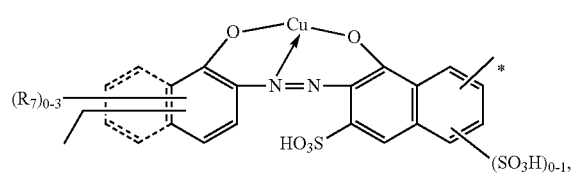

and

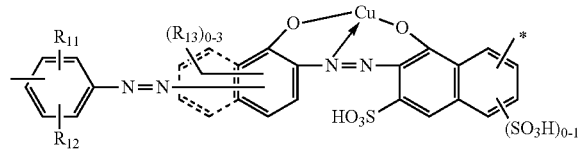

wherein * represents a position for connecting to the amino group of the formula (I);

$(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{11}$ is hydrogen, halogen, hydroxyl, carboxyl, sulfo, amino, nitro, cyano, acetylamino, ureido, $C_{1-4}$ alkyl and $C_{1-4}$ alkoxy;

$R_{12}$ is hydrogen, halogen, hydroxyl, carboxyl, sulfo, amino, nitro, cyano, acetylamino, ureido, $C_{1-4}$ alkyl and $C_{1-4}$ alkoxy; and $(R_{13})_{0-3}$ is 0 to 3 identical or different groups, and each of $R_{13}$ independently is selected from the group consisting of halogen, hydroxyl, carboxyl, sulfo, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

9. The reactive dyestuff with a N-alkylamino group as claimed in claim 1, wherein $A_1$ and $A_2$ each independently are a monoazo component selected from the group consisting of

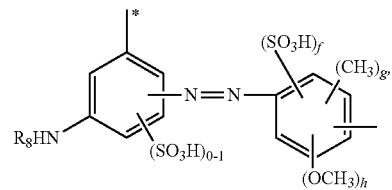

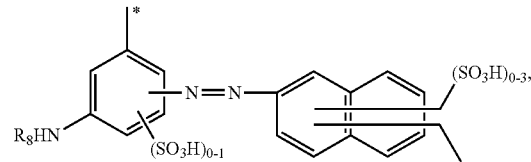

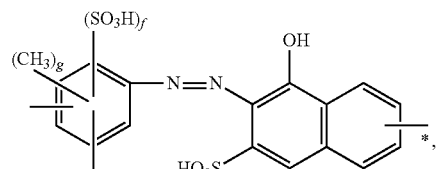

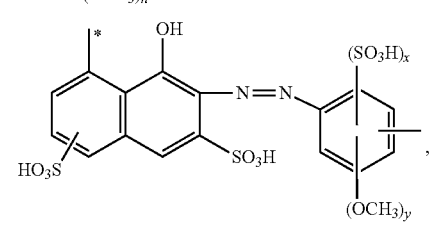

-continued

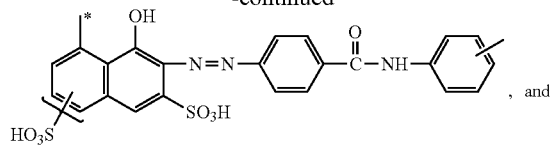, and

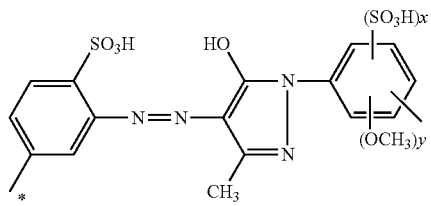

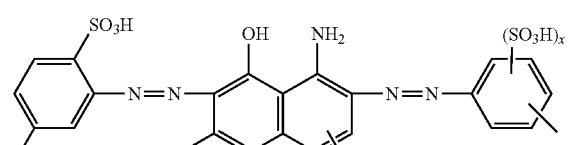,

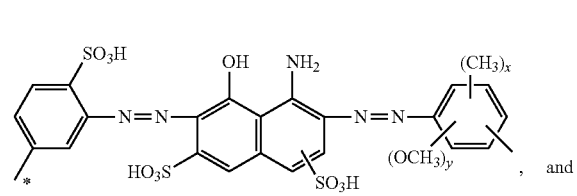, wherein * represents a position for connecting to the amino group of the formula (I);

$R_8$ is hydrogen, $C_{1-4}$ alkyl, $C_{2-4}$ alkylcarboxyl or $C_{1-4}$ alkyl substituted by hydroxyl, cyano, acetyl, amido, carboxyl, sulfo, methoxycarbonyl, ethoxycarbonyl or acetoxy;

f, g and h are integers independent of one another between 0 to 2, and f+g+h is an integer between 0 to 3; and x and y are integers independent of one another between 0 to 2, and x+y is an integer between 0 to 3.

10. The reactive dyestuff with a N-alkylamino group as claimed in claim 1, wherein $A_1$ and $A_2$ each independently are a disazo component selected from the group consisting of

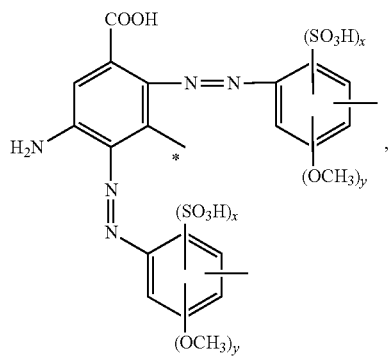

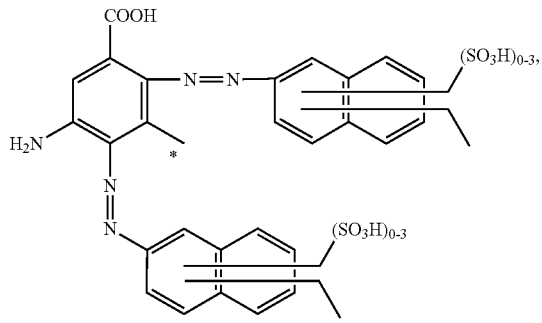

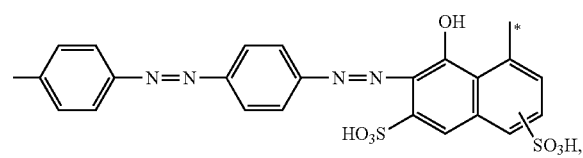

wherein * represents a position for connecting to the amino group of the formula (I); and x and y are integers independent of one another between 0 to 2, and x+y is an integer between 0 to 3.

11. The reactive dyestuff with a N-alkylamino group as claimed in claim 1, wherein $A_1$ and $A_2$ each independently are a metal complex azo component of the following formula,

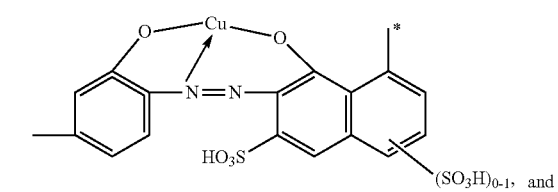

wherein * represents a position for connecting to the amino group of the formula (I).

12. The reactive dyestuff with a N-alkylamino group as claimed in claim 1, wherein the reactive dyestuff of the formula (I) is a compound of the following formula

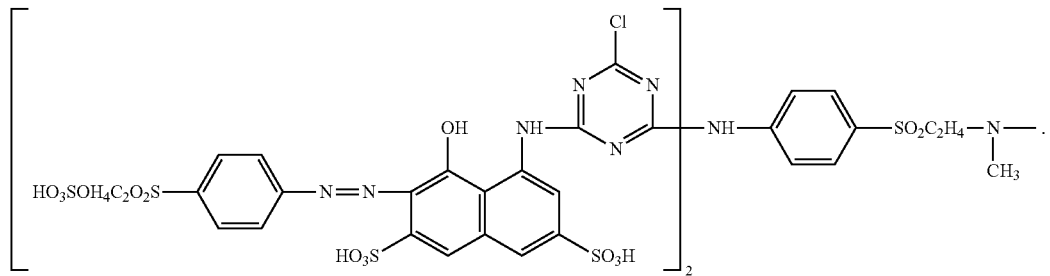

13. The reactive dyestuff with a N-alkylamino group as claimed in claim 1, wherein the reactive dyestuff of the formula (I) is a compound of the following formula (2),

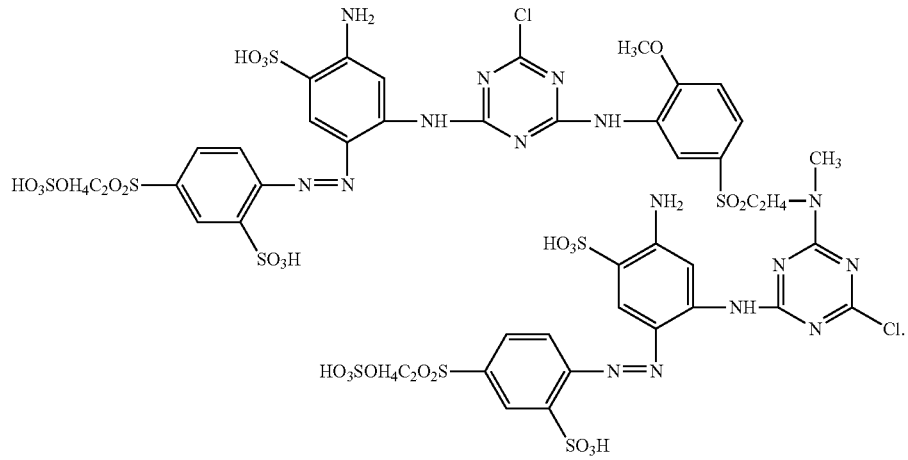

14. The reactive dyestuff with a N-alkylamino group as claimed in claim 1, wherein the reactive dyestuff of the formula (I) is a compound of the following formula (3),

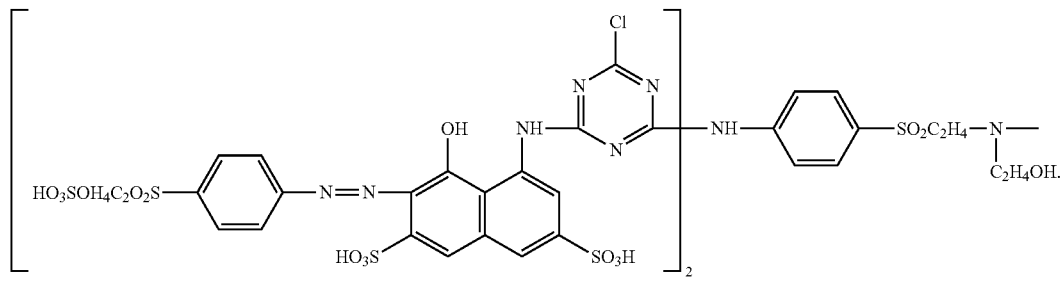

15. The reactive dyestuff with a N-alkylamino group as claimed in claim 1, wherein the reactive dyestuff of the formula (I) is a compound of the following formula (50),

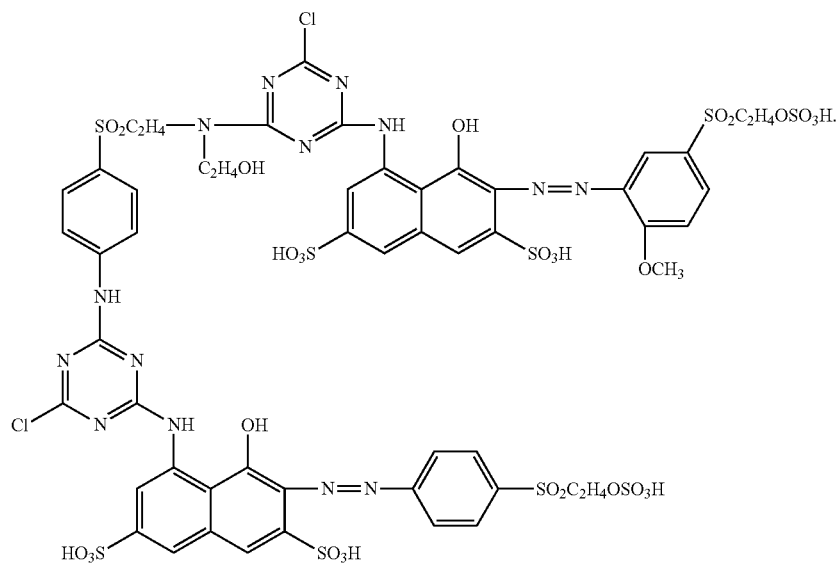
(50)
\* \* \* \* \*